(12) United States Patent
Nagayoshi et al.

(10) Patent No.: US 7,306,665 B2
(45) Date of Patent: Dec. 11, 2007

(54) FRICTION MATERIAL COMPOSITION AND FRICTION MATERIAL USING THE COMPOSITION

(75) Inventors: Teruyuki Nagayoshi, Hitachi (JP); Noboru Suzuki, Hitachi (JP); Manabu Ono, Hitachi (JP)

(73) Assignee: Hitachi Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/487,543

(22) PCT Filed: Dec. 13, 2002

(86) PCT No.: PCT/JP02/13052

§ 371 (c)(1),
(2), (4) Date: Feb. 24, 2004

(87) PCT Pub. No.: WO03/052022

PCT Pub. Date: Jun. 26, 2003

(65) Prior Publication Data

US 2004/0247847 A1     Dec. 9, 2004

(30) Foreign Application Priority Data

Dec. 14, 2001 (JP) ............................ 2001-381832
Mar. 28, 2002 (JP) ............................ 2002-091803

(51) Int. Cl.
*C09K 3/14*     (2006.01)
*C08J 5/14*     (2006.01)

(52) U.S. Cl. ................. 106/36; 428/292.1; 428/297.4; 428/293.4; 523/149; 523/155

(58) Field of Classification Search ................. 106/36; 428/292.1, 297.4, 293.4; 523/149, 155
See application file for complete search history.

(56) References Cited

U.S. PATENT DOCUMENTS 4,358,379 A * 11/1982 Inoue ........................ 210/663
6,413,622 B1 * 7/2002 Kobayashi ............... 428/293.1

FOREIGN PATENT DOCUMENTS

| JP | 05-317706 | | 12/1993 |
|---|---|---|---|
| JP | 07-247372 | * | 9/1995 |
| JP | 09-086924 | | 3/1997 |
| JP | 2000-219872 | | 8/2000 |
| JP | 2000-234086 | * | 8/2000 |

* cited by examiner

Primary Examiner—Michael Marcheschi
(74) Attorney, Agent, or Firm—Antonelli, Terry, Stout & Kraus, LLP.

(57) ABSTRACT

A friction material composition containing a fibrous material, a binder and a friction adjusting agent, wherein the friction adjusting agent is secondary aggregates of an activated alumina being spherical and having a diameter of 10 to 300 μm, or an activated alumina having a specific surface area of 100 to 400 m$^2$/g and an average particle diameter of 1 to 200 μm. The composition can be used for producing a friction material which exhibits significant improvement with respect to fading phenomenon, without adversely affecting its characteristics of attacking to a disc rotor, which is the article mating therewith, and without marked reduction of the friction coefficient at an elevated temperature, and is capable of controlling the thickness of the sliding film formed on a frictionally sliding face and preventing a high frequency noise (grabbing chatter).

20 Claims, 1 Drawing Sheet

FRICTION MATERIAL COMPOSITION AND FRICTION MATERIAL USING THE COMPOSITION

TECHNICAL FIELD

The present invention relates to a friction material composition suitable for the production of friction materials, such as disc brake pads and brake linings, which are used to brake cars, railroad vehicles and other various industrial machines. It also relates to a friction material produced by using the friction material composition.

BACKGROUND ART

Friction materials have been used to brake cars, railroad vehicles and other various industrial machines. The current mainstreams of the friction materials are non-asbestos disc brake pads, and, as disclosed in Japanese Patent Application Examined Publication No. 59-4462 (1984) and Japanese Patent Application Unexamined Publication No. 6-184525 (1994), contain as reinforcing fibers combinations of metal fibers, such as steel fibers, brass fibers and copper fibers, organic fibers, such as acrylic fibers, aramid fibers and phenolic fibers, and inorganic fibers, such as rock wool, potassium titanate fibers, alumina-silica fibers and carbon fibers.

In view of heat resistance and strength, phenolic resins have generally been used as binders in the friction materials, but, under such severe conditions as frictionally sliding faces are heated to 300° C. or higher, apt to cause the fading phenomenon that the friction coefficient is reduced considerably because the binders are thermally decomposed into liquid decomposed matters and lubricate the sliding faces.

Decreasing the content of organic materials and controlling the porosity of friction materials have been the conventional means for preventing the fading phenomenon, but hardly solved the problem of the reduction of friction coefficient at elevated temperatures due to the fading phenomenon.

Further, the thin sliding film formed on frictional sliding faces and composed mainly of organic matters rapidly increases the friction coefficient on braking in a cold environment, causing the problematic, high frequency noise (grabbing chatter).

To solve these problems, abrasive materials of various hardness and particle diameters have been blended to grind the film on the frictional sliding faces and controlling the thickness, but could not reduce the thickness uniformly and failed to reduce the grabbing chatter both under normal conditions and after allowing to cool. For example, In Japanese Patent Application Unexamined Publication No. 2000-234086 disclosed is a friction material comprising a fiber component, a binder and friction adjusting components, wherein calcium oxide and calcium hydroxide are used as friction adjusting components in combination with other friction adjusting components, such as activated alumina. However, even the friction material cannot prevent sufficiently the reduction of friction coefficient and the occurrence of the fading phenomenon. Additionally, as matters now stand, it can hardly reduce the grabbing chatter after allowing to cool.

DISCLOSURE OF INVENTION

An object of the invention is to provide a friction material composition suitable for the production of a friction material which can control the thickness of the sliding film formed on its frictional sliding face without considerably reducing friction coefficient at elevated temperatures, and is improved in the capability of preventing high frequency noise (grabbing chatter).

Another object of the invention is to provide a friction material composition suitable for the production of a friction material which can prevent fading phenomenon without adversely affecting its characteristics of attacking to mating disc rotors and without considerably reducing friction coefficient at elevated temperatures, and can control the thickness of the sliding film formed on its frictional sliding face and is also improved in the capability of preventing high frequency noise (grabbing chatter).

Another object of the invention is to provide a friction material composition suitable for the production of a friction material which can prevent fading phenomenon without adversely affecting its characteristics of attacking to mating disc rotors and without considerably reducing friction coefficient at elevated temperatures.

Another object of the invention is to provide a friction material composition suitable for the production of a friction material which can prevent fading phenomenon without adversely affecting its characteristics of attacking to mating disc rotors and without considerably reducing friction coefficient at elevated temperatures, and can control the thickness of the sliding film formed on its frictional sliding face and is also improved in the capability of preventing high frequency noise (grabbing chatter).

Another object of the invention is to provide a friction material, which can prevent fading phenomenon without adversely affecting its characteristics of attacking to mating disc rotors and without considerably reducing friction coefficient at elevated temperatures, and can control the thickness of the sliding film formed on its frictional sliding face and is also improved in the capability of preventing high frequency noise (grabbing chatter).

Accordingly, the present invention provides the following friction material composition and friction material.

(1) A friction material composition comprising a fibrous material, a binder and a friction adjusting agent, wherein the friction adjusting agent is spherical secondary aggregates of an activated alumina which have a diameter of 10 to 300 μm.

(2). The friction material composition defined in (1), wherein the spherical secondary aggregates of the activated alumina have a specific surface area of 100 to 400 m$^2$/g.

(3) The friction material composition defined in (1) or (2), wherein the spherical secondary aggregates of the activated alumina have an average pore diameter of 10 to 150 Å.

(4) A friction material composition comprising a fibrous material, a binder and a friction adjusting agent, wherein the friction adjusting agent is an activated alumina having a specific surface area of 100 to 400 m$^2$/g and an average particle diameter of 1 to 200 μm.

(5) The friction material composition defined in (4), wherein the activated alumina has an average pore diameter of 10 to 150 Å.

(6) A friction material produced by thermocompression molding (molding by heating and compression) of the friction material composition defined in (1), (2) or (3).

(7) A friction material produced by thermocompression molding of the friction material composition defined in (4) or (5).

BEST MODE FOR CARRYING OUT THE INVENTION

Figure 1:
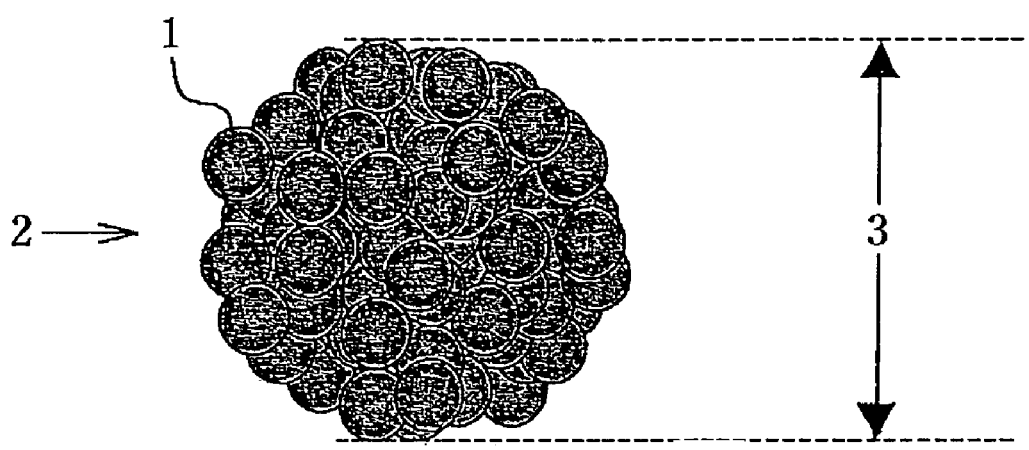
FIG. 1 is a schematic view of spherical secondary aggregates of an activated alumina used in the present invention.

As shown in FIG. 1, each spherical secondary aggregate 2 of activated alumina used in the present invention is an aggregate of a plurality of particles 1 of activated alumina (primary particles) and is spherical on the whole. Such secondary aggregates of activated alumina are advantageous because due to a decomposition mechanism catalyzed by the activated alumina, liquid decomposed matters resulting from thermal decomposition on sliding faces are removed by their accelerated catalytic decomposition, thereby preventing fading phenomenon which causes considerable reduction of friction coefficient.

Spherical secondary aggregates of activated alumina are obtainable by making small particles of aluminum hydroxide to gel, and dehydrating and drying the gel so as to form spherical aggregates.

In a cold, dry environment, the film formed on a frictional sliding face and composed mainly of organic matters rapidly increases friction coefficient, so that high frequency noise (grabbing chatter) is easily made. The use of an activated alumina, particularly the spherical secondary aggregates of activated alumina used in the present invention, accelerates the catalytic decomposition of the film of the organic matters by the decomposition mechanism due to the catalysis of activated alumina and controls the thickness of the sliding film on the sliding face, thereby preventing a rapid increase of friction coefficient and reducing the phenomenon of grabbing chatter. The spherical secondary aggregates of activated alumina are particularly effective in reduction of grabbing chatter after allowing to cool.

It is necessary that the secondary aggregates of activated alumina to be used in the present invention are spherical. For example, secondary aggregates of activated alumina having sharp edges or protrusions suffer the shortcoming of rapidly grinding the frictional sliding faces of friction materials.

The spherical secondary aggregates 2 of activated alumina that are used in the present invention and shown in FIG. 1 are 10 to 300 μm in diameter 3, preferably 75 to 300 μm, more preferably 100 to 300 μm. Spherical secondary aggregates of more than 300 μm in diameter may form a frictional sliding face that lacks uniformity in the characteristics of attacking to rotors, so that the thickness of the sliding film on the frictional sliding faces cannot be controlled and high frequency noise (grabbing chatter) cannot be prevented enough. Those of less than 10 μm in diameter may hardly maintain their spherical shapes and loose stable pores. The diameter of the spherical secondary aggregates of activated alumina may be measured by using a laser diffraction particle size distribution analyzer.

The spherical secondary aggregates of activated alumina having diameters of 10 to 300 μm are obtainable by arranging sieves one over another so that upper sieves have rougher meshes, with the lowest sieve having the smallest meshes of 10 μm in opening size and with the top sieve having the largest meshes of 300 μm in opening size, placing spherical secondary aggregates of activated alumina in the sieve of 300 μm-mesh, shaking them for 20 minutes with a shaking machine defined by JIS K 1555, and correcting from particles passed through the sieve of 300 μm-mesh those remaining on and over the sieve of 10 μm-mesh.

For example, placing sieves of opening sizes increasing by 25 μm one over another gives portions of spherical secondary aggregates of activated alumina having various ranges of diameters different by 25 μm.

The spherical secondary aggregates of activated alumina used in the present invention preferably have a specific surface area of 100 to 400 $m^2/g$, more preferably 200 to 400 $m^2/g$, further preferably 200 to 300 $m^2/g$. Pores of the spherical secondary aggregates of activated alumina having the above-described ranges of specific surface areas are suited to the adsorption of the liquid decomposed matters resulting from thermal decomposition. The catalytic decomposition mechanism of a part of the liquid decomposed matters taken in the pores accelerates the catalytic decomposition, so that the liquid matters on sliding faces are removed. Thus the reduction of friction coefficient can be prevented and fading phenomenon can be reduced. Spherical secondary aggregates of activated alumina having a specific surface area of more than 400 $m^2/g$ tend to be cracked on molding friction materials, and the molded friction materials have poor strength and considerably lose frictional characteristics. On the other hand, those having a specific surface area of less than 100 $m^2/g$ may be less effective in exhibiting their high adsorption characteristics, failing to reduce the fading phenomenon. The specific surface area of the spherical secondary aggregates of activated alumina may be measured by the BET adsorption method.

In the present invention, the above-described spherical secondary aggregates of activated alumina, which have a diameter of 10 to 300 μm and are used as a friction adjusting agent, may be substituted by primary particles of activated alumina (they, hereinafter, will be called primary particles of activated alumina) that are yet to be aggregated into secondary aggregates and have a specific surface area of 100 to 400 $m^2/g$ and an average particle diameter of 1 to 200 μm.

The primary particles of activated alumina having the above-mentioned specific surface area can also adsorb in their pores the liquid decomposed matters resulting from thermal decomposition. The catalytic decomposition mechanism of a part of the liquid decomposed matters taken in the pores accelerates the catalytic decomposition, so that the liquid matters on sliding faces are removed. Thus the reduction of friction coefficient can be prevented and fading phenomenon can be reduced.

The primary particles of activated alumina used in the present invention preferably have a specific surface area of 100 to 400 $m^2/g$, more preferably 200 to 400 $m^2/g$, further preferably 200 to 300 $m^2/g$. Primary particles of activated alumina having a specific surface area of more than 400 $m^2/g$ will be cracked on molding friction materials, giving molded friction materials having poor strength and considerably inferior frictional characteristics. On the other hand, those having a specific surface area of less than 100 $m^2/g$ will be less effective in exhibiting their high adsorption characteristics, failing to reduce fading phenomenon. The specific surface area of the primary particles of activated alumina may be measured by the BET adsorption method.

The primary particles of activated alumina have an average particle diameter of 1 to 200 μm, preferably 3 to 100 μm, more preferably 5 to 70 μm. Primary particles of activated alumina having an average particle diameter of more than 200 μm will be less effective in exhibiting their excellent adsorption characteristics, failing to reduce fading phenomenon. Those having an average particle diameter of less than 1 μm will have considerably reduced specific surface area, failing to reduce fading phenomenon. The average particle diameter of primary particles of activated alumina may be measured using a laser diffraction particle size distribution analyzer.

The primary particles of activated alumina used in the present invention are particles of γ-alumina, which are obtainable by drying aluminum hydroxide at a low temperature and then calcining (activating) the resulting alumina gel at 500 to 800° C., and are characterized in having a specific surface area of 100 to 400 $m^2/g$ and an average particle diameter of 1 to 200 μm and having pores extending from their respective surfaces to centers.

In the present invention, it is necessary to use as a friction adjusting agent the above-described spherical secondary aggregates of activated alumina or primary particles of activated alumina, namely γ-alumina. α-alumina (having a specific surface area of about 12 $m^2/g$) adversely affects the characteristics of attacking to disc rotors, thereby increasing grabbing chatter both before and after allowing to cool and causing fading phenomenon that is a considerable reduction of friction coefficient at high temperatures.

The pores of the spherical secondary particles or primary particles of activated alumina to be used in the present invention preferably have an average pore diameter of 10 to 150 Å, more preferably 20 to 130 Å, further preferably 50 to 100 Å. The average pore diameter may be measured by the BET adsorption method.

The content of the spherical secondary aggregates of activated alumina or the primary particles of activated alumina in the whole composition is preferably 0.1 to 30% by weight, more preferably 0.3 to 25% by weight, further preferably 0.5 to 20% by weight. If it is more than 30% by weight, excessive attacking to rotors may aggravates grabbing chatter, and if less than 0.1% by weight, it may become difficult to prevent fading phenomenon that is a considerable reduction of friction coefficient at high temperatures. Particularly, the content of the primary particles of activated alumina in the whole friction material composition is preferably 1 to 30% by weight, more preferably 3 to 25% by weight, further preferably 5 to 20% by weight, while the content of the spherical secondary aggregates of activated alumina in the whole friction material composition is preferably 0.1 to 10% by weight, more preferably 0.3 to 5% by weight, further preferably 0.5 to 3% by weight.

The materials of the friction material of the present invention are not particularly limited, and may be either of a semi-metallic type or of a non-steel type.

In the friction material composition of the present invention, the fibrous material, the binder and other friction adjusting agents, which may be used in addition to the above-described spherical secondary aggregates of activated alumina or the primary particles of activated alumina, are not particularly limited, and may be known ones. Non-limiting examples of usable fibrous materials include steel fiber, brass fiber, copper fiber, aramid fiber, acrylic fiber, phenolic fiber, wollastonite, ceramic fiber, rock wool, potassium titanate fiber and carbon fiber. Non-limiting examples of usable binders include thermosetting resins, such as phenolic resin, epoxy resin, melamine resin and cashew resin, and rubber compositions, such as NBR, SBR ad IR. Non-limiting examples of usable friction adjusting agents other than the spherical secondary aggregates of activated alumina and the primary particles of activated alumina include organic friction adjusting agents, such as cashew dust and rubber dust and inorganic friction adjusting agents, such as barium sulfate, graphite, antimony trisulfide, zeolite, mica, zirconia, silica, zeolite, calcium carbonate and magnesium carbonate. Metal powders, such as brass and copper powders, may optionally be added.

The content of the fibrous material in the whole friction material composition is preferably 30 to 60% by weight, more preferably 40 to 50% by weight. The content of the binder in the whole friction material composition is preferably 3 to 25% by weight, more preferably 5 to 20% by weight, further preferably 7 to 12% by weight. The content of the organic friction adjusting agent in the whole composition is preferably 1 to 15% by weight, more preferably 2 to 12% by weight. The content of the inorganic friction adjusting agent other than activated alumina in the whole friction material composition is preferably 20 to 50% by weight, more preferably 25 to 45% by weight.

The content of the optional metal powder in the whole friction material composition is preferably 1 to 20% by weight, more preferably 3 to 15% by weight.

These components are mixed to keep the whole composition 100% by weight.

The friction material of the present invention is obtainable by mixing the friction material composition, which comprises the fibrous material, the binder, the friction adjusting agent and other optional components including the optional metal powder, to form a uniform mixture, pre-molding the mixture, inserting a backing metal and the pre-molded product in a mold, and then carrying out molding by thermocompression molding, optional after-heat treatment, and scorching for removing organic components exposed on the surface.

The pre-molding is carried out at room temperature with a pressure lower than that for the molding by thermocompression molding. The thermocompression molding temperature is preferably 130 to 170° C., more preferably 140 to 160° C. The thermocompression molding pressure is preferably 20 to 60 MPa, more preferably 30 to 50 MPa. The compression time is preferably 1 to 10 minutes, more preferably 3 to 7 minutes. The temperature of the optional heat treatment is preferably 150 to 300° C., more preferably 170 to 250° C. The heat treatment time is preferably 2 to 8 hours, more preferably 3 to 7 hours. Non-limiting examples of the methods of the scorching include pressing a hot plate to the friction material, heating with direct fire, such as flames of a gas, or heating by irradiation of far infrared rays or the like. The scorching conditions may be varied depending on the materials used. For example, in cases where the binder is a phenolic resin, the scorching temperature is preferably 400 to 600° C., more preferably 450 to 500° C. The treating time is preferably 1 to 10 minutes, more preferably 2 to 8 minutes.

Hereinafter, the invention will be described referring to working examples.

EXAMPLES 1-8 AND COMPARATIVE EXAMPLES 1-9

Example 1

A γ-alumina (primary particles of activated alumina) having an average pore diameter of 50 Å, an average particle diameter of 50 μm and a specific surface area of 400 $m^2/g$ and other components listed in Table 1 were mixed in the amounts listed in Table 1 in an mixer at a rotational speed of 3000 r/min for 4 minutes, to give a friction material composition A.

Example 2

A γ-alumina (primary particles of activated alumina) having an average pore diameter of 150 Å, an average particle diameter of 50 μm and a specific surface area of 400 m²/g and other components listed in Table 1 were mixed in the amounts listed in Table 1 in an mixer at a rotational speed of 3000 r/min for 4 minutes, to give a friction material composition B.

Example 3

A γ-alumina (primary particles of activated alumina) having an average pore diameter of 50 Å, an average particle diameter of 50 μm and a specific surface area of 100 m²/g and other components listed in Table 1 were mixed in the amounts listed in Table 1 in an mixer at a rotational speed of 3000 r/min for 4 minutes, to give a friction material composition C.

Example 4

A γ-alumina (primary particles of activated alumina) having an average pore diameter of 150 Å, an average particle diameter of 50 μm and a specific surface area of 100 m²/g and other components listed in Table 1 were mixed in the amounts listed in Table 1 in an mixer at a rotational speed of 3000 r/min for 4 minutes, to give a friction material composition D.

Comparative Example 1

A γ-alumina (primary particles of activated alumina) having an average pore diameter of 100 Å, an average particle diameter of 50 μm and a specific surface area of 50 m²/g and other components listed in Table 1 were mixed in the amounts listed in Table 1 in an mixer at a rotational speed of 3000 r/min for 4 minutes, to give a friction material composition E.

Comparative Example 2

A γ-alumina (primary particles of activated alumina) having an average pore diameter of 100 Å, an average particle diameter of 50 μm and a specific surface area of 500 m²/g and other components listed in Table 1 were mixed in the amounts listed in Table 1 in an mixer at a rotational speed of 3000 r/min for 4 minutes, to give a friction material composition F.

Comparative Example 3

A γ-alumina (primary particles of activated alumina) having an average pore diameter of 30 Å, an average particle diameter of 50 μm and a specific surface area of 50 m²/g and other components listed in Table 1 were mixed in the amounts listed in Table 1 in an mixer at a rotational speed of 3000 r/min for 4 minutes, to give a friction material composition G.

Comparative Example 4

A γ-alumina (primary particles of activated alumina) having an average pore diameter of 200 Å, an average particle diameter of 50 μm and a specific surface area of 50 m²/g and other components listed in Table 1 were mixed in the amounts listed in Table 1 in an mixer at a rotational speed of 3000 r/min for 4 minutes, to give a friction material composition H.

Comparative Example 5

A non-activated α-alumina having an average particle diameter of 10 μm and a specific surface area of 20 m²/g and other components listed in Table 1 were mixed in the amounts listed in Table 1 in an mixer at a rotational speed of 3000 r/min for 4 minutes, to give a friction material composition I.

Each of the friction material compositions A, B, C and D obtained in Examples 1-4 and the friction material compositions E, F, G, H and I obtained in Comparative Examples 1-5 was pre-molded by compressing for 5 seconds at room temperature with a pressure of 20 MPa. Each of the resulting pre-moldings and a backing metal for a disc brake pad were inserted in a mold, and thermocompression molding was carried out for 5 minutes at a temperature of 152.5±2.5° C. with a pressure of 49 MPa. The products were heat treated at 200° C. for 5 hours, polished after cooling and subjected to surface scorching treatment at 470±10° C. for 5 minutes, to obtain disc brake pads A, B, C, D, E, F, G, H and I of 127 mm long between one and the other end.

TABLE 1

(unit: wt %)

| Components | Example No. | | | | Comparative Example No. | | | | |
|---|---|---|---|---|---|---|---|---|---|
| | 1 | 2 | 3 | 4 | 1 | 2 | 3 | 4 | 5 |
| Phenolic resin *[1] | 15.0 | 15.0 | 15.0 | 15.0 | 15.0 | 15.0 | 15.0 | 15.0 | 15.0 |
| NBR powder *[2] | 5.0 | 5.0 | 5.0 | 5.0 | 5.0 | 5.0 | 5.0 | 5.0 | 5.0 |
| Copper fiber *[3] | 18.0 | 18.0 | 18.0 | 18.0 | 18.0 | 18.0 | 18.0 | 18.0 | 18.0 |
| Ceramic fiber *[4] | 7.0 | 7.0 | 7.0 | 7.0 | 7.0 | 7.0 | 7.0 | 7.0 | 7.0 |
| Aramid fiber *[5] | 5.0 | 5.0 | 5.0 | 5.0 | 5.0 | 5.0 | 5.0 | 5.0 | 5.0 |
| Potassium titanate fiber *[6] | 10.0 | 10.0 | 10.0 | 10.0 | 10.0 | 10.0 | 10.0 | 10.0 | 10.0 |
| Zirconia | 3.0 | 3.0 | 3.0 | 3.0 | 3.0 | 3.0 | 3.0 | 3.0 | 3.0 |
| Graphite *[7] | 5.0 | 5.0 | 5.0 | 5.0 | 5.0 | 5.0 | 5.0 | 5.0 | 5.0 |
| Barium sulfate | 13.0 | 13.0 | 13.0 | 13.0 | 13.0 | 13.0 | 13.0 | 13.0 | 13.0 |

TABLE 1-continued (unit: wt %)

| Components | Example No. | | | | Comparative Example No. | | | | |
|---|---|---|---|---|---|---|---|---|---|
| | 1 | 2 | 3 | 4 | 1 | 2 | 3 | 4 | 5 |
| Cashew dust *8 | 6.0 | 6.0 | 6.0 | 6.0 | 6.0 | 6.0 | 6.0 | 6.0 | 6.0 |
| Antimony trisulfide | 3.0 | 3.0 | 3.0 | 3.0 | 3.0 | 3.0 | 3.0 | 3.0 | 3.0 |
| γ-alumina | | | | | | | | | |
| Content | 10.0 | 10.0 | 10.0 | 10.0 | 10.0 | 10.0 | 10.0 | 10.0 | — |
| Average pore diameter (Å) | 50 | 150 | 50 | 150 | 100 | 100 | 30 | 200 | — |
| Specific surface area ($m^2/g$) | 400 | 400 | 100 | 100 | 50 | 500 | 50 | 50 | — |
| α-almunia | | | | | | | | | |
| Content | — | — | — | — | — | — | — | — | 10.0 |
| Particle diameter (μm) | — | — | — | — | — | — | — | — | 10 |
| Specific surface area ($m^2/g$) | — | — | — | — | — | — | — | — | 20 |

*1 Phenolic resin, produced by Hitachi Chemical Co., Ltd., Trade name: HP491UP
*2 NBR powder, produced by Nippon Zeon Co., Ltd., Trade name: NIPOL1411
*3 Copper fiber, produced by GMT, Trade name: Cu-540
*4 Ceramic fiber, produced by Shin-Nittetsu Co., Ltd., Trade name: K306
*5 Aramid fiber, produced by Toray•Du Pont Co., Ltd., Trade name: Kevlar fiber IF 538
*6 Potassium titanate fiber, produced by Otsuka Kagaku Kabushiki Kaisha, Trade name: TOFICA YD
*7 Graphite, produced by Kabushiki Kaisha Chuetsu Kokuen Kogyosho, Trade name: G-70H
*8 Cashew dust, produced by Cashew Kabushiki Kaisha, Trade name: H9047

The disc brake pads A, B, C and D of the present invention and the comparative disc brake pads E, F, G, H and I were tested for comparison. The results are shown in Table 2. The tests were carried out as follows.

① Evaluation of Fading

The passenger car brake dynamo meter testing method according to JASO C406-87 was conducted by using a dynamo tester, and the minimum friction coefficient (μ) during the first fading test and the minimum friction coefficient (μ) during one braking were determined.

② Evaluation of Grabbing Chatter

In an urban district, 1000 km was covered by a 2000-cc automatic clutch car of 1600 kg in weight and of a collet type (cylinder surface area: 28 $cm^2$) in brake type, and the grabbing chatter percentage was determined from the following equation.

grabbing chatter percentage(%)=(number of the times of grabbing chatter)/(number of the times of braking)×100

③ Evaluation of Abrasion

The passenger car brake dynamometer test according to JASO C406-87 was carried out, and then the abrasions of disc rotors were measured.

TABLE 2

| | Minimum friction coefficient during fading test (μ) | Minimum friction coefficient during one braking (μ) | Percentage of grabbing chatter (%) | Abrasion of disc rotor (μm) |
|---|---|---|---|---|
| Ex. 1 | 0.33 | 0.26 | 0.23 | 11.2 |
| Ex. 2 | 0.35 | 0.28 | 0.17 | 9.8 |
| Ex. 3 | 0.30 | 0.21 | 0.20 | 10.5 |
| Ex. 4 | 0.32 | 0.23 | 0.15 | 12.2 |
| Comp. Ex. 1 | 0.20 | 0.16 | 0.56 | 10.8 |
| Comp. Ex. 2 | 0.24 | 0.19 | 0.35 | 12.8 |
| Comp. Ex. 3 | 0.18 | 0.13 | 0.86 | 11.1 |
| Comp. Ex. 4 | 0.23 | 0.17 | 0.44 | 13.3 |
| Comp. Ex. 5 | 0.16 | 0.12 | 2.25 | 45.3 |

As to the percentage of grabbing chatter and the abrasion of disc rotor, the less, the better, and as to the friction coefficient, the larger, the better.

As apparent from Table 2, the disc brake pads produced from the friction material compositions of Examples according to the present invention caused less fading phenomenon due to less reduction of friction coefficient, were less abrasive to disc rotors and caused less grabbing chatter. To the contrary, the disc brake pads produced by using the friction material compositions of Comparative Examples 1-4 contained activated alumina, but caused larger reductions of friction coefficient at high temperatures and also caused grabbing chatter more frequently.

The disc brake pad produced by using the friction material composition of Comparative Example 5 was extremely abrasive to the disc rotor and caused a larger reduction of friction coefficient at high temperatures and considerably frequent grabbing chatter.

Example 5

A spherical γ-alumina (spherical secondary aggregates of activated alumina) having an average pore diameter of 50 Å, particle diameters of 75±25 μm and a specific surface area of 250 m²/g and other components listed in Table 3 were mixed in the amounts listed in Table 3 in an mixer at a rotational speed of 3000 r/min for 4 minutes, to give a friction material composition J.

Example 6

A spherical γ-alumina (spherical secondary aggregates of activated alumina) having an average pore diameter of 50 Å, particle diameters of 250±25 μm and a specific surface area of 250 m²/g and other components listed in Table 3 were mixed in the amounts listed in Table 3 in an mixer at a rotational speed of 3000 r/min for 4 minutes, to give a friction material composition K.

Example 7

A spherical γ-alumina (spherical secondary aggregates of activated alumina) having an average pore diameter of 100 Å, particle diameters of 75±25 μm and a specific surface area of 206 m² μg and other components listed in Table 3 were mixed in the amounts listed in Table 3 in an mixer at a rotational speed of 3000 r/min for 4 minutes, to give a friction material composition L.

Example 8

A spherical γ-alumina (spherical secondary aggregates of activated alumina) having an average pore diameter of 100 Å, particle diameters of 250±25 μm and a specific surface area of 200 m²/g and other components listed in Table 3 were mixed in the amounts listed in Table 3 in an mixer at a rotational speed of 3000 r/min for 4 minutes, to give a friction material composition M.

Comparative Example 6

A spherical γ-alumina (spherical secondary aggregates of activated alumina) having an average pore diameter of 100 Å, particle diameters of 10±5 μm and a specific surface area of 200 m²/g and other components listed in Table 3 were mixed in the amounts listed in Table 3 in an mixer at a rotational speed of 3000 r/min for 4 minutes, to give a friction material composition N.

Comparative Example 7

A spherical γ-alumina (spherical secondary aggregates of activated alumina) having an average pore diameter of 100 Å, particle diameters of 350±25 μm and a specific surface area of 200 m²/g and other components listed in Table 3 were mixed in the amounts listed in Table 3 in an mixer at a rotational speed of 3000 r/min for 4 minutes, to give a friction material composition O.

Comparative Example 8

A non-activated α-alumina having a particle diameter of 10 μm and a specific surface area of 20 m²/g and other components listed in Table 3 were mixed in the amounts listed in Table 3 in an mixer at a rotational speed of 3000 r/min for 4 minutes, to give a friction material composition P.

Comparative Example 9

A non-activated α-alumina having a particle diameter of 10 μm and a specific surface area of 20 m²/g and other components listed in Table 3 were mixed in the amounts listed in Table 3 in an mixer at a rotational speed of 3000 r/min for 4 minutes, to give a friction material composition Q.

Each of the friction material compositions J, K, L and M obtained in Examples 5-8 and the friction material compositions N, O, P and Q obtained in Comparative Examples 6-9 was pre-molded by compressing for 5 seconds at room temperature and with a pressure of 20 MPa. Each of the resulting pre-moldings and a backing metal for a disc brake pad were inserted in a mold, and thermocompression molding was carried out for 5 minutes at a temperature of 152.5±2.5° C. with a pressure of 49 MPa. The products were heat treated at 200° C. for 5 hours, polished after cooling and subjected to surface scorching treatment at 470±10° C. for 5 minutes, to obtain disc brake pads J, K, L, M, N, O, P and Q of 127 mm long between one and the other end.

TABLE 3

(unit: wt %)

| | Example No. | | | | Comparative Example No. | | | |
|---|---|---|---|---|---|---|---|---|
| Components | 5 | 6 | 7 | 8 | 6 | 7 | 8 | 9 |
| Phenolic resin *1 | 15.0 | 15.0 | 15.0 | 15.0 | 15.0 | 15.0 | 15.0 | 15.0 |
| NBR powder *2 | 5.0 | 5.0 | 5.0 | 5.0 | 5.0 | 5.0 | 5.0 | 5.0 |
| Copper fiber *3 | 18.0 | 18.0 | 18.0 | 18.0 | 18.0 | 18.0 | 18.0 | 18.0 |
| Ceramic fiber *4 | 7.0 | 7.0 | 7.0 | 7.0 | 7.0 | 7.0 | 7.0 | 7.0 |
| Aramid fiber *5 | 5.0 | 5.0 | 5.0 | 5.0 | 5.0 | 5.0 | 5.0 | 5.0 |
| Potassium titanate fiber *6 | 10.0 | 10.0 | 10.0 | 10.0 | 10.0 | 10.0 | 10.0 | 10.0 |
| Zirconia | 3.0 | 3.0 | 3.0 | 3.0 | 3.0 | 3.0 | 3.0 | 3.0 |
| Graphite *7 | 5.0 | 5.0 | 5.0 | 5.0 | 5.0 | 5.0 | 5.0 | 5.0 |
| Barium sulfate | 22.0 | 22.0 | 22.0 | 22.0 | 22.0 | 22.0 | 22.0 | 22.5 |
| Cashew dust *8 | 6.0 | 6.0 | 6.0 | 6.0 | 6.0 | 6.0 | 6.0 | 6.0 |
| Antimony trisulfide | 3.0 | 3.0 | 3.0 | 3.0 | 3.0 | 3.0 | 3.0 | 3.0 |
| γ-alumina | | | | | | | | |
| Content | 1.0 | 1.0 | 1.0 | 1.0 | 1.0 | 1.0 | — | — |
| Average pore diameter (Å) | 50 | 50 | 100 | 100 | 100 | 100 | — | — |

TABLE 3-continued (unit: wt %)

| Components | Example No. | | | | Comparative Example No. | | | |
|---|---|---|---|---|---|---|---|---|
| | 5 | 6 | 7 | 8 | 6 | 7 | 8 | 9 |
| Diameter (μm) | 75 ± 25 | 250 ± 25 | 75 ± 25 | 250 ± 25 | 15 ± 10 | 350 ± 25 | — | — |
| α-alumina Content | — | — | — | — | — | — | 1.0 | 0.5 |
| Diameter (μm) | — | — | — | — | — | — | 10 | 10 |

*[1] Phenolic resin, produced by Hitachi Chemical Co., Ltd., Trade name: HP491UP
*[2] NBR powder, produced by Nippon Zeon Co., Ltd., Trade name: NIPOL1411
*[3] Copper fiber, produced by GMT, Trade name: Cu-540
*[4] Ceramic fiber, produced by Shin-Nittetsu Co., Ltd., Trade name: K306
*[5] Aramid fiber, produced by Toray•Du Pont Co., Ltd., Trade name: Kevlar fiber IF 538
*[6] Potassium titanate fiber, produced by Otsuka Kagaku Kabushiki Kaisha, Trade name: TOFICA YD
*[7] Graphite, produced by Kabushiki Kaisha Chuetsu Kokuen Kogyosho, Trade name: G-70H
*[8] Cashew dust, produced by Cashew Kabushiki Kaisha, Trade name: H9047

The disc brake pads J, K, L and M of the present invention and the comparative disc brake pads N, O, P and Q were tested for comparison. The results are shown in Table 4. The tests were carried out as follows.

① Evaluation of Grabbing Chatter

In an urban district, 1000 km was covered by a 2000-cc automatic clutch car of 1600 kg in weight and of a collet type (cylinder surface area: 28 cm²) in brake type, and the grabbing chatter percentage was determined from the following equation.

grabbing chatter percentage(%)=(number of the times of grabbing chatter)/(number of the times of braking)×100

② Evaluation of Grabbing Chatter after Allowing to Cool

Passenger car brake dynamo meter testing method was conducted in an environment of room temperature (5° C.), humidity of 40% and absolute humidity of 2.8 g/m³, and the grabbing chatter percentage was determined from the above-mentioned equation.

③ Evaluation of Fading

The passenger car brake dynamo meter testing method according to JASO C406-87 was conducted by using a dynamo tester, and the minimum friction coefficient (μ) during the first fading test and the minimum friction coefficient (μ) during one braking were determined.

TABLE 4

| | Percentage of grabbing chatter (%) | Percentage of grabbing chatter after allowing to cool (%) | Minimum friction coefficient during fading test (μ) | Minimum friction coefficient during one braking (μ) |
|---|---|---|---|---|
| Ex. 5 | 0.21 | 0.10 | 0.30 | 0.21 |
| Ex. 6 | 0.25 | 0.08 | 0.28 | 0.23 |
| Ex. 7 | 0.23 | 0 | 0.26 | 0.21 |
| Ex. 8 | 0.25 | 0.06 | 0.28 | 0.19 |
| Comp. Ex. 6 | 0.43 | 0.32 | 0.24 | 0.15 |
| Comp. Ex. 7 | 0.53 | 0.43 | 0.24 | 0.15 |
| Comp. Ex. 8 | 0.63 | 0.52 | 0.22 | 0.17 |
| Comp. Ex. 9 | 0.72 | 0.63 | 0.23 | 0.15 |

*[1] As to the percentage of grabbing chatter and that of grabbing chatter after cooling, the less, the better.
*[2] As to the friction coefficient, the larger, the better.

As apparent from Table 4, the disc brake pads produced by using the friction material compositions of Examples according to the present invention caused less grabbing chatter and less grabbing chatter after allowing to cool, and caused less fading phenomenon due to less reductions of friction coefficient. To the contrary, the disc brake pads produced by using the friction material compositions of Comparative Examples 6 and 7 contained spherical secondary aggregates of activated alumina, but caused grabbing chatter and grabbing chatter after allowing to cool more frequently, and caused considerable reduction of friction coefficient at high temperatures.

The disc brake pads produced by using the friction material compositions of Comparative Examples 8 and 9 caused grabbing chatter and grabbing chatter after allowing to cool very frequently, and caused considerable reduction of friction coefficient at high temperatures.

INDUSTRIAL APPLICABILITY

The friction material produced by using the friction material composition of the present invention exhibits significant improvement with respect to fading phenomenon, without adversely affecting its characteristics of attacking to mating disc rotors and without marked reduction of the friction coefficient at high temperatures, and can control the thickness of the sliding film formed on its frictional sliding face and prevent high frequency noise (grabbing chatter). The friction material, therefore, is very suitable for industrial application.

The invention claimed is:

1. A friction material composition comprising a fibrous material, a binder and a friction adjusting agent, wherein:
the binder is a thermosetting resin or a rubber composition, and
the friction adjusting agent comprises:
(a) spherical secondary aggregates of an activated alumina which have a diameter of 10 to 300 μm,
(b) an organic friction adjusting agent selected from the group consisting of cashew dust and rubber dust, and,
(c) an inorganic friction adjusting agent other than the spherical secondary aggregates of an activated alumina,
wherein each of said spherical secondary aggregates is an aggregate of a plurality of primary particles; and
wherein the friction material composition contains 30 to 60% by weight of the fibrous material, 3 to 25% by weight of the binder, 0.1 to 10% by weight of the spherical secondary aggregates of an activated alumina, 1 to 15% by weight of the organic friction adjusting agent and 20 to 50% by weight of the inorganic friction adjusting agent.

2. A friction material composition consisting essentially of a fibrous material, a binder and a friction adjusting agent, wherein:
the binder is a thermosetting resin or a rubber composition, and
the friction adjusting agent consists essentially of:
(a) an activated alumina having a specific surface area of 100 to 400 $m^2/g$ and an average particle diameter of 1 to 200 μm,
(b) an organic friction adjusting agent selected from the group consisting of cashew dust and rubber dust, and
(c) an inorganic friction adjusting agent other than the activated alumina,
wherein the friction material composition contains 30 to 60% by weight of the fibrous material, 3 to 25% by weight of the binder, 1 to 30% by weight of the activated alumina, 1 to 15% by weight of the organic friction adjusting agent and 20 to 50% by weight of the inorganic friction adjusting agent.

3. The friction material composition of claim 1, wherein the spherical secondary aggregates of the activated alumina have a specific surface area of 100 to 400 $m^2/g$.

4. The friction material composition of claim 1, wherein the spherical secondary aggregates of the activated alumina have an average pore diameter of 10 to 150 Å.

5. The friction material composition of claim 2, wherein the activated alumina has an average pore diameter of 10 to 150 Å.

6. A friction material produced by thermocompression molding of the friction material composition of claim 1.

7. A friction material produced by thermocompression molding of the friction material composition of claim 2.

8. A friction material produced by thermocompression molding of the friction material composition of claim 3.

9. A friction material produced by thermocompression molding of the friction material composition of claim 4.

10. A friction material produced by thermocompression molding of the friction material composition of claim 5.

11. The friction material composition of claim 1, wherein the diameter of the secondary aggregates is 100 to 300 μm.

12. The friction material composition of claim 2, wherein the specific surface area of the activated alumina is 200 to 300 $m^2/g$, and the average particle diameter thereof is 5 to 70 μm.

13. The friction material composition of claim 2, wherein the activated alumina is in the form of primary particles.

14. The friction material composition of claim 1, wherein the fibrous material is selected from the group consisting of steel fiber, brass fiber, copper fiber, aramid fiber, acrylic fiber, phenolic fiber, wollastonite, ceramic fiber, rock wool, potassium titanate fiber and carbon fiber.

15. The friction material composition of claim 1, wherein the inorganic friction adjusting agent is selected from the group consisting of barium sulfate, graphite, antimony trisulfide, zeolite, mica, zirconia, silica, calcium carbonate, and magnesium carbonate.

16. The friction material composition of claim 1, wherein the spherical secondary aggregates of an activated alumina have a diameter of 75 to 300 μm.

17. The friction material composition of claim 2, wherein the fibrous material is selected from the group consisting of steel fiber, brass fiber, copper fiber, aramid fiber, acrylic fiber, phenolic fiber, wollastonite, ceramic fiber, rock wool, potassium titanate fiber and carbon fiber.

18. The friction material composition of claim 2, wherein the inorganic friction adjusting agent is selected from the group consisting of barium sulfate, graphite, antimony trisulfide, zeolite, mica, zirconia, silica, calcium carbonate, and magnesium carbonate.

19. The friction material composition of claim 15, which further comprises metal powder.

20. The friction material composition of claim 1, which further comprises metal powder.

* * * * *